United States Patent

Mahn, Jr.

Patent Number: 5,380,391
Date of Patent: Jan. 10, 1995

[54] HEAT ACTIVATED TRANSFER FOR ELASTOMERIC MATERIALS

[76] Inventor: John Mahn, Jr., 6154 Oakhaven Dr., Cincinnati, Ohio 45238

[21] Appl. No.: 27,954

[22] Filed: Mar. 8, 1993

[51] Int. Cl.[6] .................. B32B 25/00; B60C 13/00
[52] U.S. Cl. ................... 156/240; 156/230; 156/278; 156/307.1; 152/523; 428/493; 428/914; 8/471
[58] Field of Search .............. 8/471; 156/116, 278, 156/307.10; 428/914, 493; 152/524, 523; 158/252, 267, 240, 242

[56] References Cited

U.S. PATENT DOCUMENTS

| | | | |
|---|---|---|---|
| 2,911,280 | 11/1959 | Cicogna | 8/2.5 |
| 2,984,596 | 5/1951 | Franer | 161/167 |
| 2,985,216 | 5/1961 | Williams | 152/330 |
| 3,502,495 | 3/1970 | Akamatsu | 117/38 |
| 3,508,492 | 4/1970 | Seibert et al. | 101/470 |
| 3,729,041 | 4/1973 | Kabota | 152/524 X |
| 3,733,212 | 5/1973 | McCafferty | 117/14 |
| 3,952,131 | 4/1976 | Sioema | 156/240 X |
| 4,021,591 | 5/1977 | DeVries et al. | 428/200 |
| 4,059,471 | 11/1977 | Haign | 156/244.27 |
| 4,202,663 | 5/1980 | Haigh et al. | 8/471 |
| 4,224,268 | 9/1980 | Mergi | 156/116 X |
| 4,238,190 | 12/1980 | Rejto | 8/471 |
| 4,253,878 | 3/1981 | Mizuno | 8/471 X |
| 4,269,885 | 5/1981 | Mahn | 428/216 |
| 4,297,099 | 10/1981 | Simon | 8/484 X |
| 4,354,851 | 10/1982 | Hix | 8/471 X |
| 4,395,263 | 7/1983 | Davis | 8/471 X |
| 4,465,728 | 8/1984 | Haign | 8/471 X |
| 4,541,340 | 9/1985 | Peart et al. | 101/470 |
| 4,560,623 | 3/1987 | Berger | 156/267 X |
| 4,576,610 | 3/1986 | Donenfeld | 8/471 |
| 4,599,259 | 7/1986 | Kobayashi | 8/471 X |
| 4,610,904 | 9/1986 | Mahn, Sr. et al. | 428/79 X |
| 4,690,858 | 9/1987 | Oka | 8/471 X |
| 4,692,198 | 9/1987 | Borreson | 156/267 X |
| 4,738,949 | 4/1988 | Settii | 8/471 X |
| 4,820,310 | 4/1989 | Kukui | 8/471 X |
| 4,910,189 | 3/1990 | Kahn | 8/471 X |
| 4,977,134 | 12/1990 | Jongewaard et al. | 503/227 |
| 5,160,383 | 11/1992 | Gartland | 152/510 X |

FOREIGN PATENT DOCUMENTS

| | | | |
|---|---|---|---|
| 0097528 | 1/1984 | European Pat. Off. | 8/471 |
| 0234563 | 9/1987 | European Pat. Off. | B41M 5/26 |
| 0249918 | 12/1987 | European Pat. Off. | 152/523 |
| 2460586 | 7/1976 | Germany | 152/524 |
| 1463072 | 2/1977 | United Kingdom | 8/471 |

Primary Examiner—David A. Simmons
Assistant Examiner—Charles Rainwater

[57] ABSTRACT

An article and method for marking elastomeric articles, such as tires, floor mats, and the like, includes an elastomeric sheet which is marked with indicia using a solvent based ink which contrasts with the elastomeric sheet. The indicia is cured with a clear thermoset layer such as a polyurethane. This is then applied to an uncured elastomeric article and the elastomeric article is cured. The heat and the pressure of curing causes the elastomeric sheet to bond to the elastomeric article. The indicia remains discernible and is not easily marred or dulled. After curing, the transfer can be further marked by heat transferring indicia in the form of a sublimation dye through the clear polyurethane layer.

5 Claims, 1 Drawing Sheet

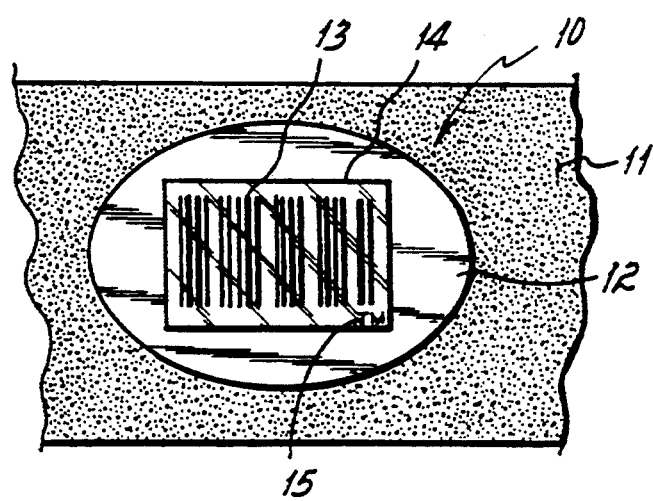

HEAT ACTIVATED TRANSFER FOR ELASTOMERIC MATERIALS

BACKGROUND OF THE INVENTION

Elastomers are a group of materials, which at room temperature can be stretched repeatedly and returned to their original length. This is used to form many different items such as tires, mats, fan belts, hoses, gloves, gaskets, and the like. Frequently there is a need to apply indica onto the surface of these items. The indicia can be in the form of an advertisement or it can have a more practical purpose such as providing a machine readable bar code onto the surface of the article for inventory control.

There are inks, dyes, and paints which can be applied to the surface of cured elastomeric articles. These, however, are difficult or expensive to apply and can be easily abraded making, the indicia unreadable. Indicia in the form of contrasting elastomeric material can be cured into the surface of the elastomeric article. This, for example, is how the whitewall of a whitewall tire is formed. But this method has limited utility.

Heat activated transfers are used to provide indicia for various articles. But, these transfers generally cannot withstand curing conditions and/or abuse in use. If applied after cure, the bond may not withstand abrasive forces and the indicia itself can be marred even if the transfer remains bonded to the substrate.

SUMMARY OF THE INVENTION

The present invention is premised on the realization that an indicia bearing transfer which can be bonded to the surface of an elastomeric article is formed from an elastomeric sheet marked with indicia using a solvent based ink. The indicia is coated with a clear thermoset layer which protects the indicia. In one embodiment, the elastomeric sheet is applied to an uncured elastomeric article and the article is cured. The heat and the pressure of the curing process causes the elastomeric sheet to be bonded to the elastomeric article, but does not destroy the indicia.

After curing, the thermoset layer protects the indicia layer preventing abrasion. Further, the elastomeric sheet remains tightly bonded to the elastomeric substrate providing a permanent marking for the elastomeric article.

In a second embodiment, the elastomeric sheet marked with the solvent based ink and coated with a clear thermoset layer is simply glued onto a cured elastomeric article.

The objects and advantages of the present invention will be further appreciated in light of the following detailed description.

BRIEF DESCRIPTION OF THE DRAWING

The FIGURE is a perspective view of the present invention partially broken away.

DETAILED DESCRIPTION

According to the present invention, a transfer 10 suitable for use in marking an elastomeric substrate or article 11 is formed from an elastomeric sheet material 12 marked with an indicia 13 formed from a solvent based ink. The indicia is in turn coated with a thermoset clear layer 14 which protects the indicia during application and subsequent to application.

For use in the present invention, the elastomeric layer 12 and the substrate 11 can be the same or any different compatible elastomeric material. The curable elastomeric materials which can be used include nitrile rubber, chlorinated polyethylene, neoprene (chloroprene polymers), chlorosulfonyl polyethylene (Hypalon), ethylene ether polysulfides, ethylene polysulfides, ethylene propylene copolymers (EPM), ethylene propylene terpolymers (EPDM), fluorinated hydrocarbons, fluorosilicone, isobutylene isoprene, organopolysiloxanes, acrylic rubbers, polybutadienes, polyepichlorohydrens, natural rubber, synthetic isoprene, urethane rubbers. (both polyurethane (polyester), and polyurethane (polyethers)) as well as Buna S rubbers such as styrene butadiene copolymer. It is preferred that the substrate and elastomeric layer be formed from the same material.

In a first embodiment, the elastomeric substrate can be any uncured elastomeric article. These can be, for example, tires, rubber mats, rubber hoses, elastomeric gaskets, elastomeric sheets, gloves, and other articles of clothing such as boots, hats, or whatever.

The elastomeric sheet material 12 must be an elastomer which is compatible with the elastomeric substrate 11 or base. Preferably, they will be of the same elastomeric type, but certainly this is a matter of choice. Those skilled in the art can easily select elastomers which can be bonded together by co-curing under heat and pressure or other similar manner.

Preferably, the elastomeric sheet will be relatively thin having a thickness of from about 1 to about 15 mils with about 3-7 mils being preferred. The elastomeric sheet must contrast with the ink indicia 13 which will be applied and it may be desirable for it to contrast with the substrate 11 also. Generally, a good contrasting surface is a white surface. One excellent white elastomeric sheet is natural polybutadiene rubber. Sheets of 10-12 mils, which are already formulated with a heat activated curing agent, antioxidants, and non-staining additives can be purchased from Tech International, Inc. of Johnstown, Ohio. Likewise, cured sheets can also be purchased.

The elastomeric sheet is prepared for printing or coating by cleaning surface with a chlorinated hydrocarbon wipe such as methylene chloride or 1,1,1 trichloroethane. In addition, bleaching the surface with sodium hypochlorite and hydrochloric acid prepares the surface for printing and allows better adhesion of ink and overcoat.

The elastomeric base sheet 12 is then marked with the indicia. The indicia is in the form of a contrasting organic solvent based ink. Any organic solvent based ink having a color which contrasts with the color of the elastomeric base material is suitable for use in the present invention. Such solvent based inks are generally simply dispersions of dye particles in an organic solvent. The organic solvent acts to partially dissolve or attack the elastomeric sheet material allowing the ink particles to migrate into the surface of the elastomeric sheet providing indicia which contrasts with the base sheet material.

Suitable inks include Encore brand L449, Flexo Inks sold by Croda (ketone and alcohol based inks), Jet Inks sold by Video Jet (ketone and alcohol inks).

The indicia can be applied in any well known manner including ink jet printing, offset printing, dot matrix printing, screen printing, and flexographic printing.

After the indicia 13 is applied, it is coated with a clear thermoset layer 14. Any clear thermoset polymer which will bond to the elastomeric base sheet and can withstand the curing conditions will function in the present invention. Thus, for example typical sulfur curing agents are activated at 300° F.–400° F. for a period of about 30 minutes. Therefore, the thermoset layer would have to withstand these conditions. Likewise, if the curing system was an electron beam curing system, the thermoset layer would have to withstand the energy from the electron beam.

Suitable thermoset layers, of course, are well known. Typical clear thermoset layers for use in the present invention would include thermoset polyamides, thermoset polyurethanes, thermoset polyisocyanates, thermoset polyesters, and thermoset epoxies. Commercially available clear thermoset polymers include Sinclair Zephylon brand and Lord Corp Chemglaze brand thermoset polyurethanes.

The thermoset layer is applied as a solvent dispersion at a thickness of about 0.1 to 10 mils and preferably 0.5 mil. Upon drying, the layer will set providing a protective coating over the indicia.

The heat activated transfer 10 is bonded onto the elastomeric substrate 11 by simply pressing the uncoated side of the elastomeric sheet 12 onto the elastomeric article 11 and curing article 11. An organic solvent may be applied to the surface to increase tackiness and improve adhesion. If any talc is present or a parting agent is present on the elastomeric base 11, this must be removed with a solvent prior to application on the transfer 10. Once applied to the substrate 11, the heat activated transfer 10 can be coated with a parting agent such as talc if necessary and then is subjected to curing conditions.

Generally, the article is cured at 350° to 400° F. for a period of 15 to 30 minutes. Generally the elastomeric article will be cured in a mold which will in effect apply pressure to the transfer ensuring that it bonds to the elastomeric substrate during curing. The curing process will cure the substrate and bond it to the elastomeric sheet forming a permanent bond between the materials. This is the same process used to apply whitewalls to tires. The thermoset layer 14 will protect the indicia 13 applied into the surface of the elastomeric sheet 12 and prevent it from being destroyed during application.

In a less preferred embodiment, both the elastomeric sheet 12 and the elastomeric article are uncured. The sheet is marked with indicia and coated with a thermoset layer as before and is co-cured with the elastomeric article which permanently bonds the two together.

In certain applications, it may be preferred to apply the transfer to a cured rubber article. In such situations, the transfer is formed with a cured elastomeric base sheet 12 as previously described and the cured elastomeric base sheet is simply adhered to the cured rubber article using an appropriate adhesive such as the solvent based thermoset adhesive used with tire repair kits.

Once the transfer is applied by curing or using an adhesive, the transfer 10 can be further marked with a sublimation dye 15. This is applied by reverse printing a sublimation dye onto a transfer sheet. The transfer sheet (not shown) is pressed against the thermoset layer 14 with the dye 15 contacting the thermoset layer 14. Application of heat (about 250° to 400° F.) will cause the dye to migrate through the thermoset layer into the elastomeric sheet 12. Again, the sublimation dye must contrast with the base layer 12.

Preferred sublimation dyes in ribbon form for dot matrix printers can be purchased from Encore and Fugi KK. Kodak also sells sublimation dyes suitable for use in the present invention.

In an alternate embodiment of the present invention, the solvent indicia layer 13 can be omitted. The contrasting elastomeric sheet 12 coated with thermoset layer can be cured onto the elastomeric article 11. After curing the elastomeric sheet, the indicia in the form of a sublimation dye, can be applied directly to the clear thermoset layer. The application of heat and pressure causes the sublimation dye to heat transfer through the thermoset layer onto the elastomeric sheet layer permanently marking the article and permitting the thermoset layer to protect the indicia. Generally heat applied at 350° F. for 3–10 seconds is sufficient to cause the sublimation dye to transfer onto sheet 12.

The heat activated transfer of the present invention is suitable for application of bar code dam onto elastomeric base substrates using either embodiment. This is particularly important when individual codes are required for individual articles permitting different codes to be printed and applied one at a time. Since the present invention employs an ink which can be applied, for example, with an ink jet printer, the person forming and applying these has unlimited freedom in modifying or creating individual indicia for different transfers. Further, and equally important is the ability of the clear layer to protect the indicia. If the indicia were to smear or was easily abraded, it would be unsuitable for bar code application purposes.

The preceding has been a description of the present invention along with the preferred method of practicing the invention. However, the invention should be defined only by the appended claims wherein I claim:

I claim:

1. A method of forming a marked elastomeric article comprising:
    forming indicia on an elastomeric sheet by coating a portion of said sheet with a contrasting solvent based ink;
    coating said indicia with a clear thermoset layer and allowing said thermoset layer to set, thereby providing a protective coating over said indicia prior to bonding said elastomeric sheet to said elastomeric article;
    applying said elastomeric sheet to said elastomeric article and curing said elastomeric article thereby bonding said elastomeric sheet to said elastomeric article.

2. The method claimed in claim 1 wherein said ink is a solvent based ink.

3. The method claimed in claim 1 wherein said elastomeric sheet has a color which contrasts with said elastomeric article.

4. The method claimed in claim 1 further comprising heat transferring additional indicia onto said sheet by heat transferring sublimation dye through said thermoset layer onto said elastomeric sheet.

5. A method of forming a marked elastomeric article comprising:
    coating an elastomeric sheet with a thermoset layer and allowing said thermoset layer to cure;
    bonding said elastomeric sheet to an elastomeric article by co-curing said elastomeric article and said elastomeric sheet;
    heat transferring indicia onto said elastomeric sheet bonded to said elastomeric article by heat transferring sublimation dye through said thermoset layer onto said elastomeric sheet after said elastomeric sheet has been co-cured with said elastomeric article.

* * * * *